(12) United States Patent
Xu et al.

(10) Patent No.: US 11,653,246 B2
(45) Date of Patent: *May 16, 2023

(54) METHOD AND DEVICE FOR CONFIGURING AND REPORTING MEASUREMENT FOR LTE/NR INTERWORKING IN WIRELESS COMMUNICATION SYSTEM

(71) Applicant: LG ELECTRONICS INC., Seoul (KR)

(72) Inventors: Jian Xu, Seoul (KR); Sangwon Kim, Seoul (KR); Daewook Byun, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,957

(22) Filed: Jul. 15, 2021

(65) Prior Publication Data

US 2021/0345150 A1 Nov. 4, 2021

Related U.S. Application Data

(63) Continuation of application No. 16/607,219, filed as application No. PCT/KR2018/004834 on Apr. 26, 2018, now Pat. No. 11,096,080.

(60) Provisional application No. 62/490,605, filed on Apr. 27, 2017.

(51) Int. Cl.
  H04W 24/10 (2009.01)
  H04W 92/20 (2009.01)

(52) U.S. Cl.
  CPC .......... H04W 24/10 (2013.01); H04W 92/20 (2013.01)

(58) Field of Classification Search
  CPC ...... H04W 92/20; H04W 76/16; H04W 24/10
  See application file for complete search history.

(56) References Cited

U.S. PATENT DOCUMENTS

| | | | |
|---|---|---|---|
| 2015/0223156 A1* | 8/2015 | Park | H04L 5/0051 370/254 |
| 2015/0327104 A1* | 11/2015 | Yiu | H04W 36/0069 455/450 |
| 2016/0330654 A1 | 11/2016 | Jung | |
| 2017/0006566 A1* | 1/2017 | Zhang | H04L 5/001 |

(Continued)

FOREIGN PATENT DOCUMENTS

| | | |
|---|---|---|
| EP | 3328117 A1 | 5/2018 |
| WO | 2014089069 A1 | 6/2014 |

OTHER PUBLICATIONS

U.S. Appl. No. 16/607,219, filed Oct. 22, 2019.

(Continued)

*Primary Examiner* — Deepa Belur
(74) *Attorney, Agent, or Firm* — Dentons US LLP

(57) ABSTRACT

Provided is a method in which a secondary node (SN) transmits a measurement configuration by multi radio access technology (RAT) dual connectivity. The SN receives, from a master node (MN), measurement configuration information related to a measurement configuration of the SN, transmits, to user equipment (UE), the measurement configuration on the basis of the measurement configuration information, and receives a measurement report on the basis of the measurement configuration from the UE.

14 Claims, 18 Drawing Sheets

(56) References Cited

U.S. PATENT DOCUMENTS

| | | |
|---|---|---|
| 2017/0034709 A1 | 2/2017 | Hapsari |
| 2017/0303182 A1* | 10/2017 | Uchino ................ H04L 5/0098 |
| 2018/0359790 A1 | 12/2018 | Ingale |
| 2019/0387424 A1* | 12/2019 | Yiu ...................... H04W 24/10 |
| 2020/0128458 A1 | 4/2020 | Yang |
| 2021/0168590 A1* | 6/2021 | Hapsari ................ H04W 76/15 |
| 2021/0212144 A1* | 7/2021 | Yang ...................... H04W 8/22 |
| 2022/0061115 A1* | 2/2022 | Takahashi .............. H04L 5/001 |

OTHER PUBLICATIONS

Nokia et al., "Measurement Coordination in LTE/NR Tight Interworking," R2-168118, 3GPP TSG-RAN WG2 Meeting #96, Reno, USA, Nov. 5, 2016, see section 3.

Samsung, "Measurement Configuration for NR Cell Addition," R2-1703019, 3GPP TSG-RAN WG2 NR #97bis, Spokane, USA, Mar. 24, 2017, see sections 1, 2.

NEC, "RRM Measurement Managed by SN in LTE-NR DC," R2-1703401, 3GPP TSG-RAN WG2 #97bis, Spokane, USA, Mar. 25, 2017, see section 2.

ZTE et al., "Consideration on the Measurement Coordination in LTE/NR Tight Interworking," R2-1702834, 3GPP TSG-RAN WG2 Meeting #97bis, Spokane, USA, Mar. 24, 2017, see section 2.

\* cited by examiner

METHOD AND DEVICE FOR CONFIGURING AND REPORTING MEASUREMENT FOR LTE/NR INTERWORKING IN WIRELESS COMMUNICATION SYSTEM

This application is a continuation application of U.S. patent application Ser. No. 16/607,219, filed on Oct. 22, 2019, now allowed, which is a 371 National Stage entry of International Application No. PCT/KR2018/004834, filed on Apr. 26, 2018, and claims priority to U.S. Provisional Application No. 62/490,605, filed on Apr. 27, 2017, all of which are incorporated by reference in their entirety herein.

TECHNICAL FIELD

The present disclosure relates to wireless communication, and more particularly, to a method and device for configuring and reporting measurements for interworking of 3rd generation partnership project (3GPP) long-term evolution (LTE) and a new radio access technology (NR) in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. The NR system may be called another name, e.g. new radio access technology (new RAT). 3GPP has to identify and develop the technology components needed for successfully standardizing the NR timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

According to new architecture for the 5G core network and 5G radio access network (RAN) including NR, a user equipment (UE) may receive a better service in view of throughput and UE experience. Also, tight interworking of LTE/NR is under discussion. Due to tight interworking of LTE/NR, interworking between an eNodeB (eNB) and a new RAN node (for example, gNB) is allowed, and as a result, throughput of a UE may be improved. An eNB of the LTE and gNB of the NR may manage resources individually. More specifically, dual/multiple connections for improving throughput of a UE according to the tight interworking of LTE/NR may be used, and signaling for UE mobility may be simplified.

SUMMARY

In tight interworking of LTE/NR, NR-based measurement mechanisms as well as LTE-based measurement mechanisms may be introduced. Accordingly, the measurement mechanism of the UE may be performed by both eNB of LTE and gNB of NR. In order to efficiently configure the measurement of the UE and receive the corresponding measurement report, a cooperation for measurement between the eNB and the gNB needs to be performed.

In an aspect, a method in which a secondary node (SN) transmits a measurement configuration in a multi radio access technology (RAT) dual connectivity is provided. The method includes receiving measurement configuration information related to the measurement configuration of the SN from a master node (MN), transmitting the measurement configuration based on the measurement configuration information to a user equipment (UE), and receiving a measurement report based on the measurement configuration from the UE.

In another aspect, a secondary node (SN) in a multi radio access technology (RAT) dual connectivity is provided. The SN includes a memory, a transceiver, and a processor connected to the memory and the transceiver, and configured to control the transceiver to receive measurement configuration information related to the measurement configuration of the SN from a master node (MN), control the transceiver to transmit the measurement configuration based on the measurement configuration information to a user equipment (UE), and control the transceiver to receive a measurement report based on the measurement configuration from the UE.

Measurement of a UE can be efficiently configured in tight interworking of LTE/NR.

DETAILED DESCRIPTION

Hereinafter, in the present disclosure, a wireless communication system based on a 3rd generation partnership project (3GPP) or institute of electrical and electronics engineers (IEEE) is mainly described. However, the present disclosure is not limited thereto, and the present disclosure may be applied to other wireless communication systems having the same characteristics to be described hereinafter.

Figure 1:
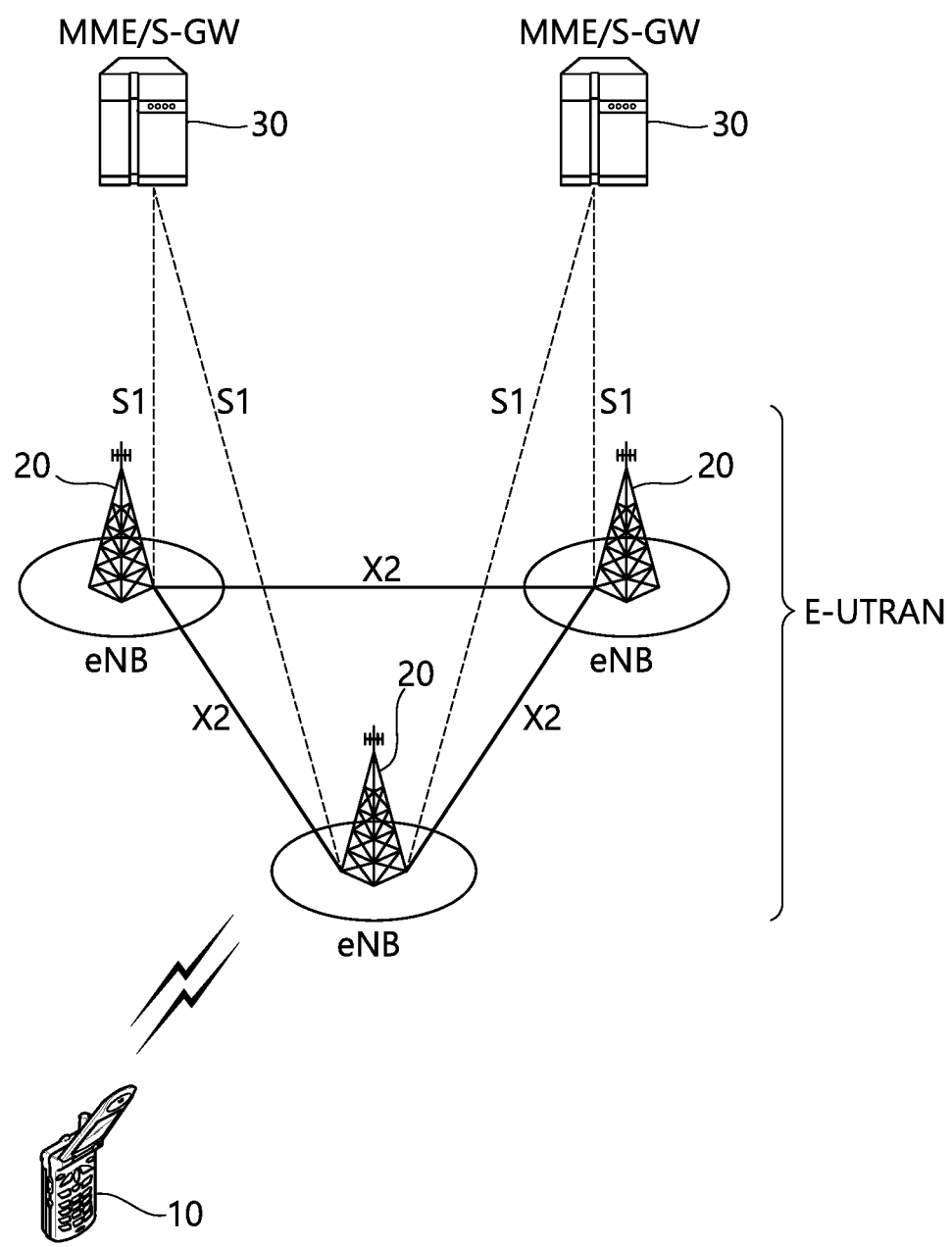
FIG. 1 shows 3GPP LTE system architecture.

FIG. 1 shows 3GPP LTE system architecture. Referring to FIG. 1, the 3GPP long-term evolution (LTE) system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. The eNB 20 is connected to the gateway 30 via an S1 interface.

5G system is a 3GPP system consisting of 5G access network (AN), 5G core network (CN) and UE. 5G access network is an access network comprising a next generation radio access network (NG-RAN) and/or non-3GPP access network connecting to a 5G core network. NG-RAN is a radio access network that supports one or more of the following options with the common characteristics that it connects to 5G core network:

1) Standalone new radio (NR).
2) NR is the anchor with E-UTRA extensions.
3) Standalone E-UTRA.
4) E-UTRA is the anchor with NR extensions.

Figure 2:
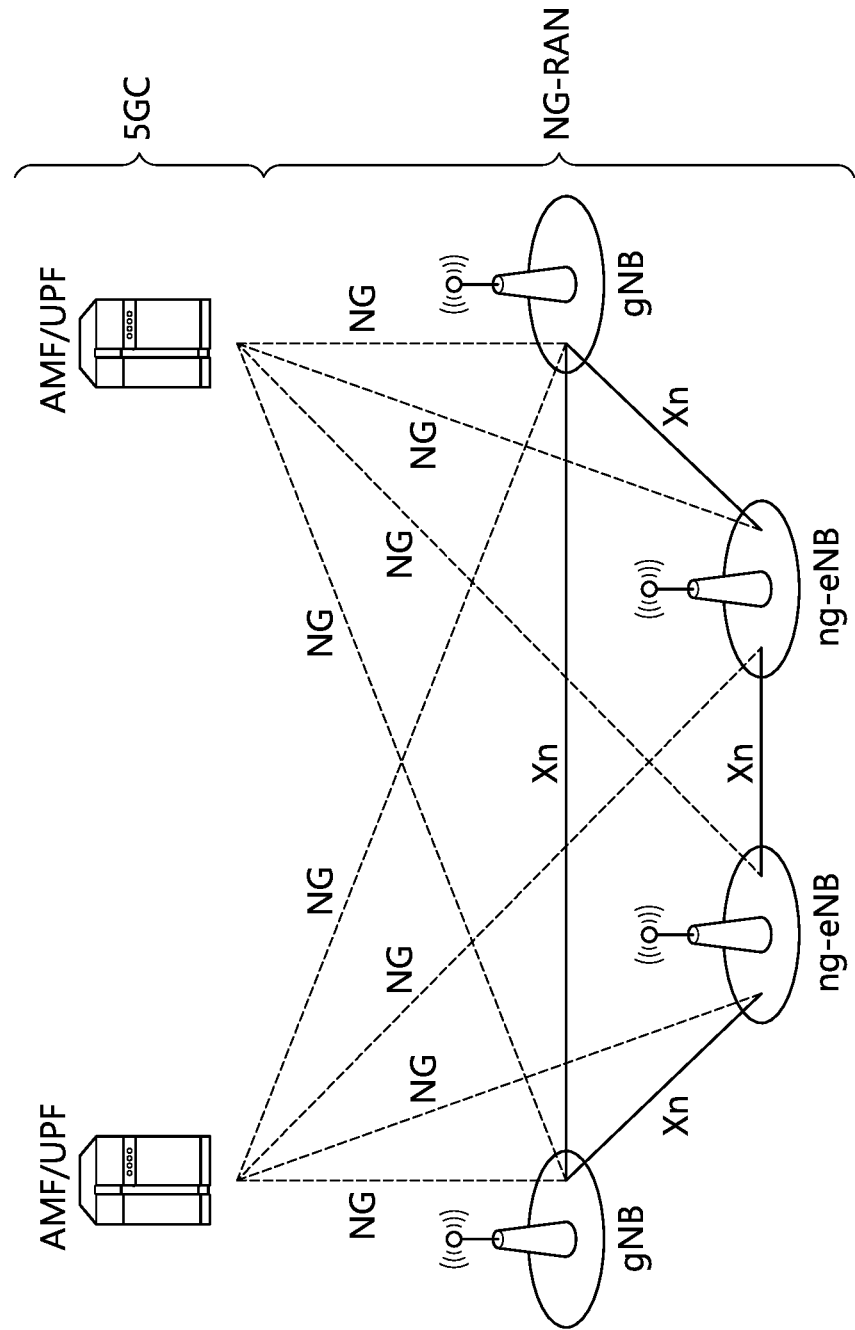
FIG. 2 shows an NG-RAN architecture.

FIG. 2 shows an NG-RAN architecture. Referring to FIG. 2, the NG-RAN includes at least one NG-RAN node. The NG-RAN node includes at least one gNB and/or at least one ng-eNB. The gNB provides NR user plane and control plane protocol terminations towards the UE. The ng-eNB provides E-UTRA user plane and control plane protocol terminations towards the UE. The gNBs and ng-eNBs are interconnected with each other by means of the Xn interface. The gNBs and ng-eNBs are also connected by means of the NG interfaces to the 5G CN. More specifically, the gNBs and ng-eNBs are connected to the access and mobility management function (AMF) by means of the NG-C interface and to the user plane function (UPF) by means of the NG-U interface.

The gNB and ng-eNB host the following functions:
Functions for radio resource management: Radio bearer control, radio admission control, connection mobility control, dynamic allocation of resources to UEs in both uplink and downlink (scheduling);
Internet protocol (IP) header compression, encryption and integrity protection of data;
Selection of an AMF at UE attachment when no routing to an AMF can be determined from the information provided by the UE;
Routing of user plane data towards UPF(s);
Routing of control plane information towards AMF;
Connection setup and release;
Scheduling and transmission of paging messages;
Scheduling and transmission of system broadcast information (originated from the AMF or operations & maintenance (O&M));
Measurement and measurement reporting configuration for mobility and scheduling;
Transport level packet marking in the uplink;
Session management;
Support of network slicing;
QoS flow management and mapping to data radio bearers;
Support of UEs in RRC_INACTIVE state;
Distribution function for non-assess stratum (NAS) messages;
Radio access network sharing;
Dual connectivity;
Tight interworking between NR and E-UTRA.
The AMF hosts the following main functions:
NAS signaling termination;
NAS signaling security;
AS security control;

Inter CN node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing;

Session management function (SMF) selection.

The UPF hosts the following main functions:

Anchor point for Intra-/Inter-radio access technology (RAT) mobility (when applicable);

External protocol data unit (PDU) session point of interconnect to data network;

Packet routing & forwarding;

Packet inspection and user plane part of policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink traffic verification (service data flow (SDF) to QoS flow mapping);

Downlink packet buffering and downlink data notification triggering.

The SMF hosts the following main functions:

Session management;

UE IP address allocation and management;

Selection and control of UP function;

Configures traffic steering at UPF to route traffic to proper destination;

Control part of policy enforcement and QoS;

Downlink data notification.

In what follows, multi-RAT dual connectivity will be described. NG-RAN supports multi-RAT dual connectivity configured so that a UE in the RRC_CONNECTED state with multiple RX/TX may use radio resources provided by two separate schedulers. Multi-RAT dual connectivity is generalization of the E-UTRA dual connectivity. Two separate schedulers are located at two different NG-RAN nodes connected to each other through a non-ideal backhaul. One of the two different NG-RAN nodes performs the role of a master node (MN), and the other one performs the role of a secondary node (SN). In other words, one scheduler is located at the MN while the other scheduler is located at the SN. The two different NG-RAN nodes provide either the E-UTRA connectivity (when the NG-RAN node is an ng-eNB) or NR connectivity (when the NG-RAN node is a gNB). The ng-eNB is a node that provides the NR user plane and control plane protocol termination toward a UE and operates as an SN in the E-UTRAN-NR dual connectivity (EN-DC). The gNB is a node that provides the E-UTRA user plane and control plane protocol termination toward a UE and is connected to 5G CN through an NG interface. The MN and SN are connected to each other through a network interface, and at least the MN is connected to the core network. Although multi-RAT dual connectivity in the present disclosure has been designed based on a non-ideal backhaul between different nodes, the multi-RAT dual connectivity may also be used for an ideal backhaul.

Figure 3:
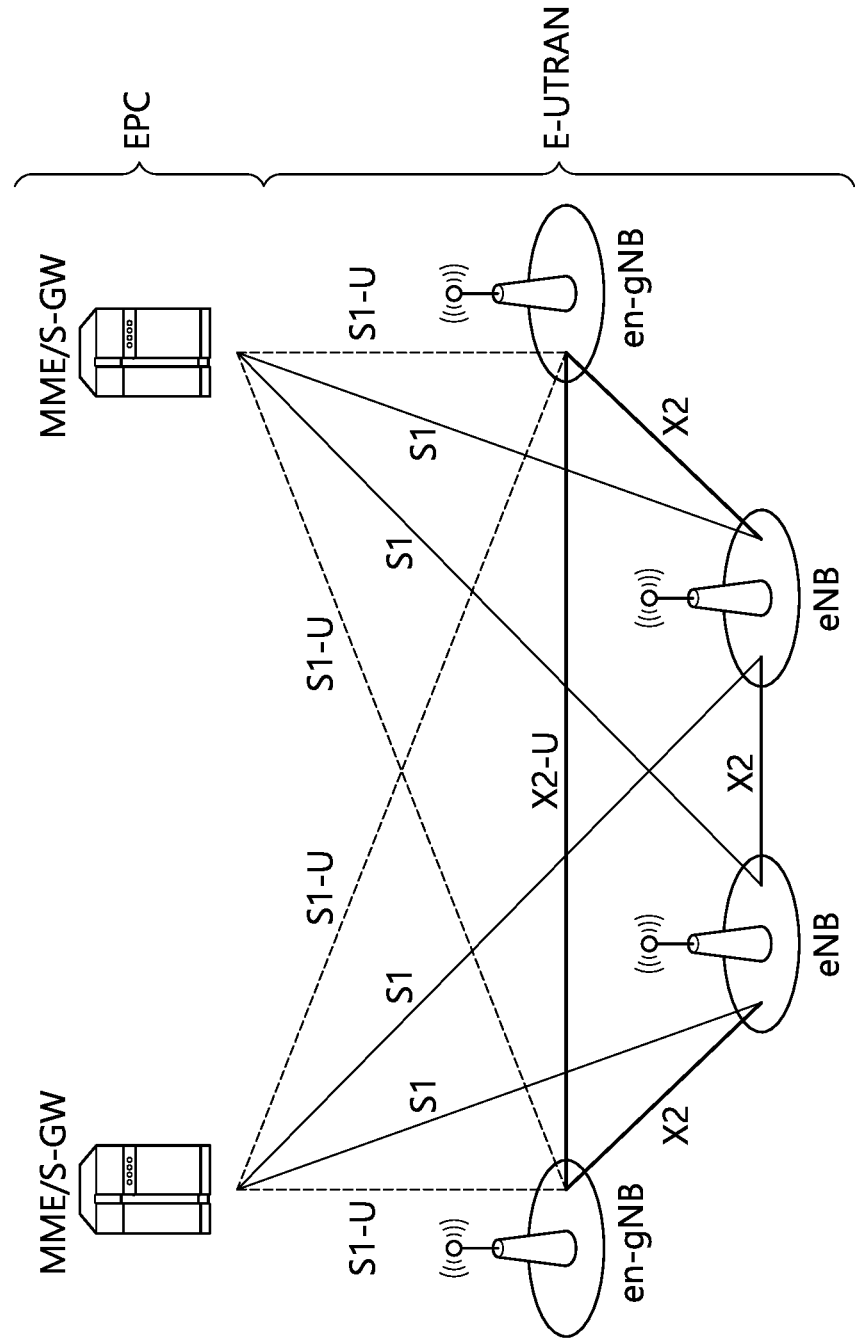
FIG. 3 shows EN-DC architecture.

FIG. 3 shows EN-DC architecture. The E-UTRAN supports multi-RAT dual connectivity through EN-DC, where a UE is connected to one eNB operating as an MN and one en-gNB operating as an SN. An eNB is connected to EPC through S1 interface and connected to en-gNB through X2 interface. The en-gNB may be connected to the EPC through S1-U interface and connected to a different en-gNB through X2-U interface.

The 5G CN also supports multi-RAT dual connectivity. An NG-RAN supports NG-RAN E-UTRA-NR dual connectivity (NGEN-DC), where a UE is connected to one ng-eNB operating as an MN and one gNB operating as an SN. The ng-eNB is connected to the 5G CN, and the gNB is connected to the ng-eNB through Xn interface. Also, the NG-RAN supports NR-E-UTRA dual connectivity (NE-DC), where a UE is connected to one gNB operating as an MN and one ng-eNB operating as an SN. The gNB is connected to the 5G CN, and ng-eNB is connected to the gNB through Xn interface.

To support the aforementioned multi-RAT dual connectivity and/or tight interworking of LTE/NR, various disposition scenarios for LTE and NR may be considered.

Figure 4:
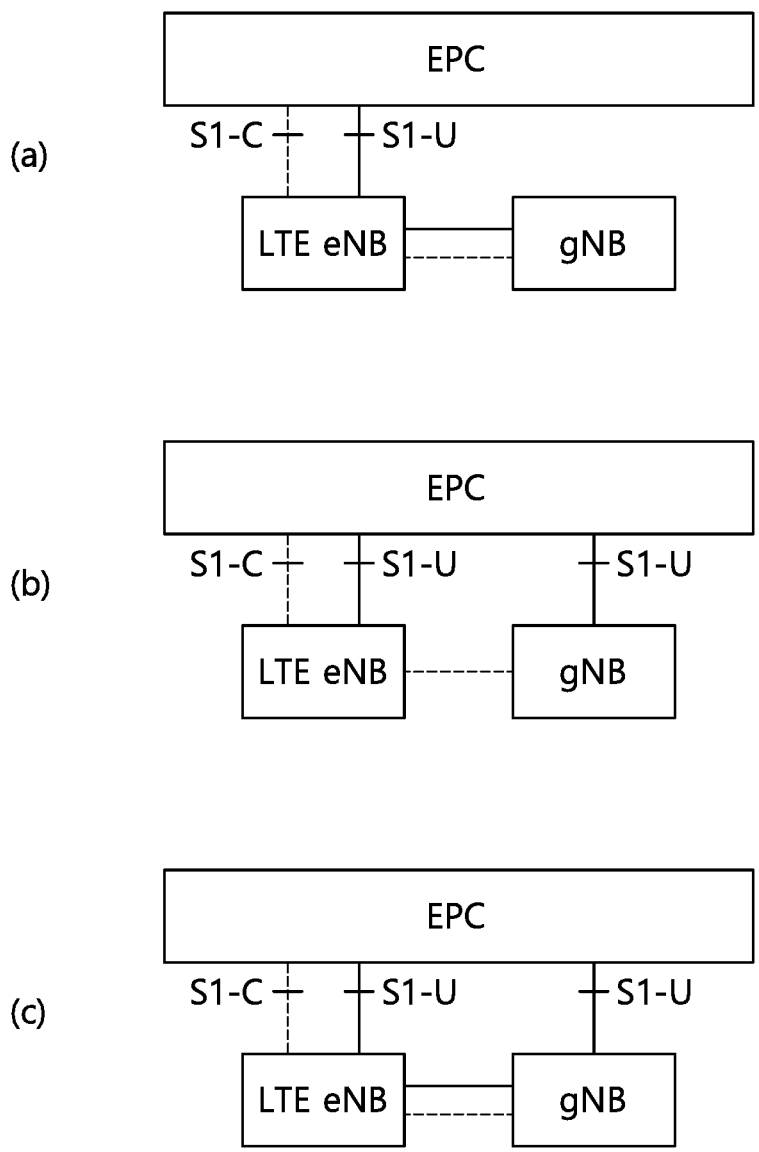
FIG. 4 shows option 3/3a/3x of the deployment scenario for tight interworking of LTE/NR.

FIG. 4 shows option 3/3a/3x of the deployment scenario for tight interworking of LTE/NR. FIG. 4(a) may be referred to as option 3, FIG. 4(b) as option 3a, and FIG. 4(c) as option 3x. In option 3/3a/3x, the LTE eNB is connected to the EPC with non-standalone NR. In other words, NR control plane is not directly connected to the EPC but connected through the LTE eNB. The NR user plane is connected to the EPC via the LTE eNB (option 3) or directly via the S1-U interface (option 3a). Or the user plane connected directly through the S1-U interface is split to the LTE eNB in the gNB (option 3x). The option 3/3a/3x correspond to the EN-DC architecture described in detail with reference to FIG. 3.

Figure 5:
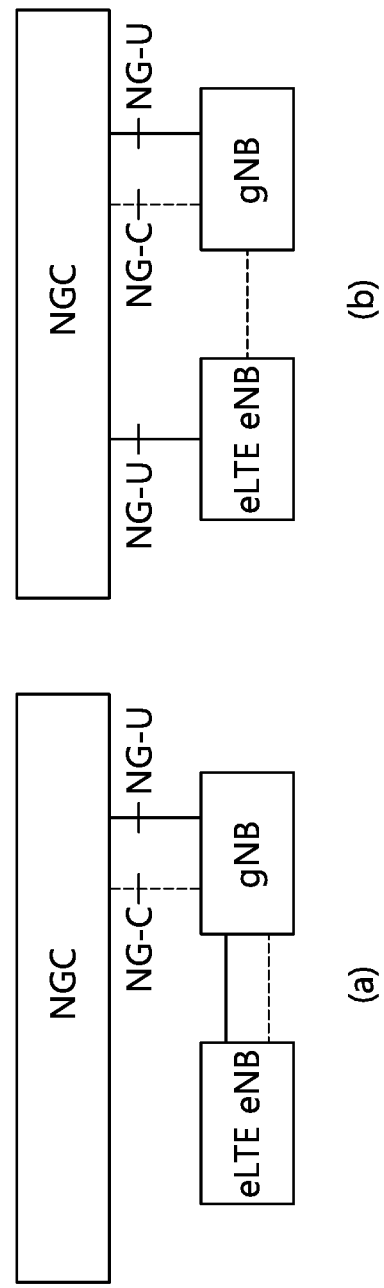
FIG. 5 shows option 4/4a of the deployment scenario for tight interworking of LTE/NR.

FIG. 5 shows option 4/4a of the deployment scenario for tight interworking of LTE/NR. FIG. 5(a) may be referred to as option 4, and FIG. 5(b) as option 4a. In option 4/4a, the gNB is connected to the NGC with non-standalone E-UTRA. In other words, the E-UTRA control plane is not directly connected to the NGC but connected through the gNB. The E-UTRA user plane is connected to the NGC via the gNB (option 4) or directly through the NG-U interface (option 4a). The option 4/4a correspond to the option 3/3a with the E-UTRA and NR interchanged.

Figure 6:
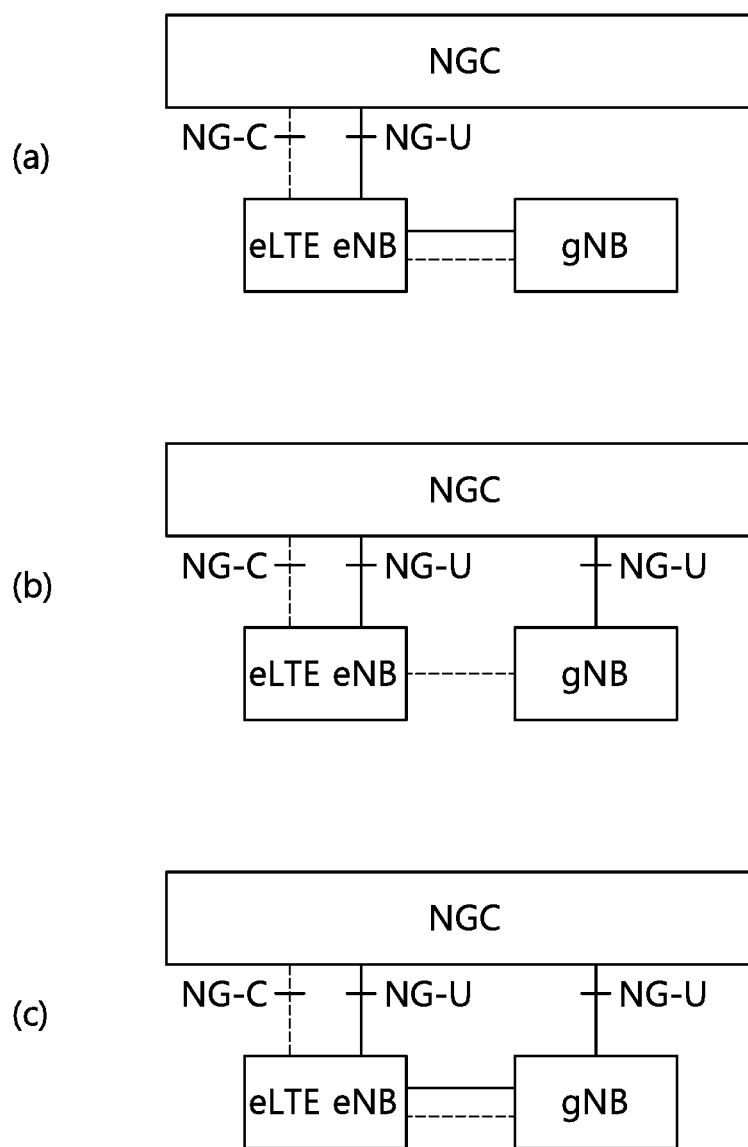
FIG. 6 shows option 7/7a/7x of the deployment scenario for tight interworking of LTE/NR.

FIG. 6 shows option 7/7a/7x of the deployment scenario for tight interworking of LTE/NR. FIG. 6(a) may be referred to as option 7, FIG. 6(b) as option 7a, and FIG. 6(c) as option 7x. In option 7/7a/7x, the eLTE eNB (namely ng-eNB) is connected to the NGC with non-standalone NR. In other words, NR control plane is not directly connected to the NGC but connected through the eLTE eNB. The NR user plane is connected to the NGC via the eLTE eNB (option 7) or directly through the NG-U interface (option 7a). Or the user plane connected directly through the NG-U interface is split to the eLTE eNB in the gNB (option 7x).

While the LTE-based measurement mechanism is used as it is, an NR-based measurement mechanism will be additionally introduced for NR. In order to support the tight interworking of the LTE/NR, the measurement mechanism of the UE needs to be performed by two RAN nodes, that is, an eNB of the LTE and a gNB of the NR. Therefore, the cooperation for measurement between two RAN nodes needs to be performed to better manage the mobility of the UE.

More specifically, in the multi-RAT dual connectivity and/or the tight interworking of the LTE/NR, a radio resource control (RRC) connection reconfiguration message, an RRC connection reconfiguration completion message, a measurement report message, etc., may be transmitted in SN through a signaling radio bearer (SRB). That is, the RRC message may be transmitted directly from the SN to the UE or may be directly transmitted from the UE to the SN through the SRB. This is because in the multi-RAT dual connectivity and/or the tight interworking of LTE/NR, the SN may also have a control plane and the RRC function may be performed through the RRC layer. Since the secondary eNB (SeNB) does not have the control plane in the conventional LTE, all of the RRC messages are transmitted to the UE via a master eNB (MeNB) or received from the UE via the MeNB.

Since the SN can directly transmit and/or receive the RRC messages in the multi-RAT dual connectivity and/or the tight interworking of the LTE/NR, the SN can manage a part of the measurement configuration and may directly configure the UE with the part of the measurement configuration. It is also possible to directly receive a measurement report corresponding to the management configuration to be managed from the UE. On the other hand, the MN can still manage the measurement configuration and can receive the measurement report corresponding to the measurement configuration to be managed from the UE. Thus, the MN and the SN need to cooperate/coordinate/negotiate with each other on how the MN and the SN each manage the measurement configuration and receive the corresponding measurement reports.

Figure 7:
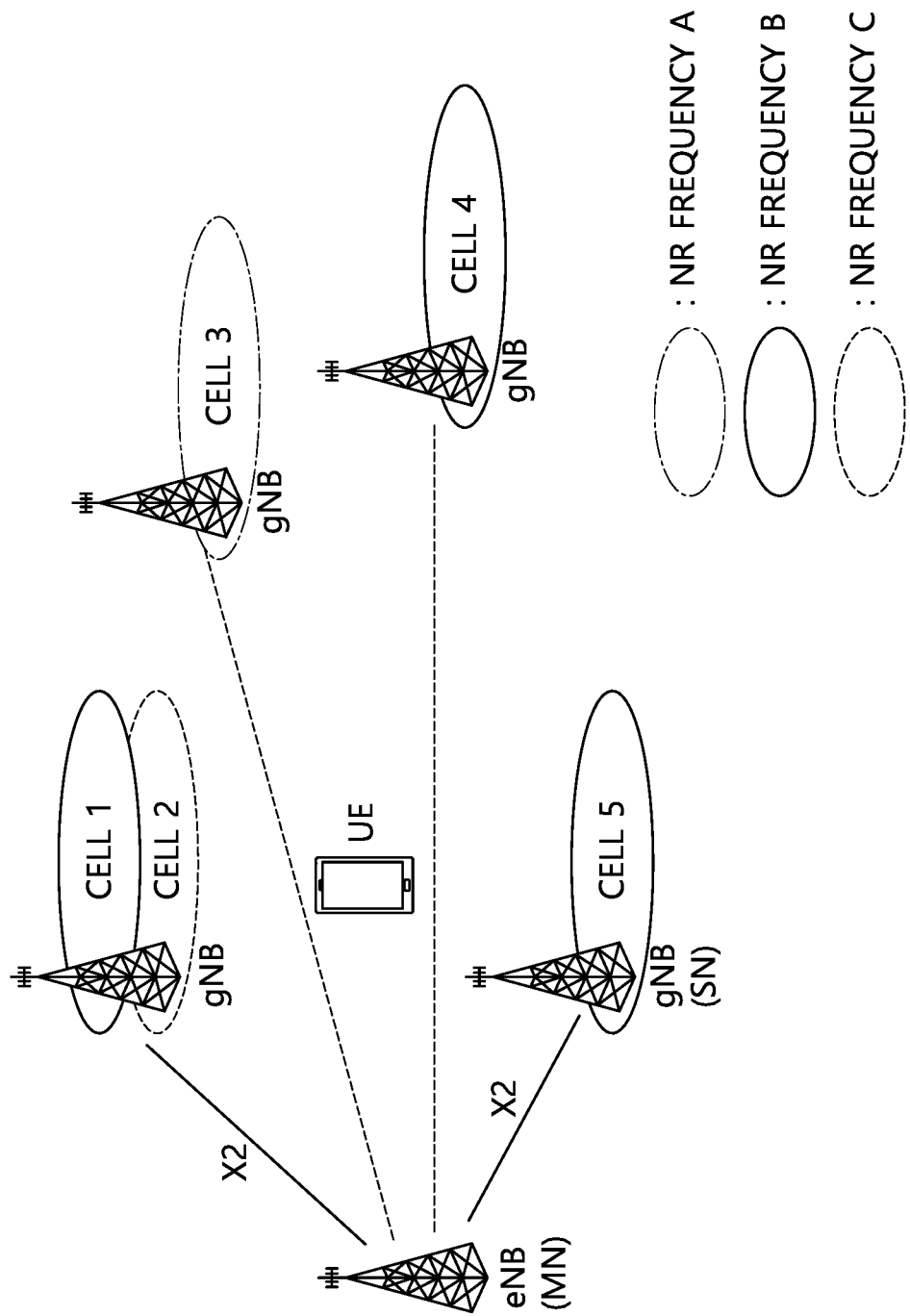
FIG. 7 shows an example of a scenario requiring the cooperation/coordination/negotiation of the measurement configuration between the MN and the SN.

FIG. 7 shows an example of a scenario requiring the cooperation/coordination/negotiation of the measurement configuration between the MN and the SN. An NR frequency to be measured on the LTE side of the UE and an NR frequency to be measured on the NR side of the UE may be different. In order to support the multi-RAT dual connectivity and/or the tight interworking of the LTE/NR, more specifically, the handover to an NR cell in EN-DC, the LTE side of the UE needs to measure all neighboring NR cells. However, considering that the reason for the NR side of the UE to measure the NR frequency is for the SN to initiate a secondary cell group (SCG) change based on the NR measurement result received from the NR side of the UE, it is preferable for the NR side of the UE to measure only the NR cell directly connected to the MN via an X2 interface. That is, the NR side of the UE may measure only the NR secondary cell (SCell) candidate connected to the MN, not all the neighboring NR cells, and report the measured result. However, the SN does not know which neighbor cell is the NR SCell candidate. That is, if the MN does not give information on the NR SCell candidate to the SN, the SN may instruct the UE to perform the measurement and reporting for the NR cell that need not be measured.

Referring to FIG. 7, there are five NR cells (cell 1, cell 2, cell 3, cell 4, and cell 5) around the UE. Of these NR cells, only the cells 1, 2, and 5 are connected to the MN through the X2 interface. That is, the cells 1, 2, and 5 correspond to the NR SCell candidates. On the other hand, the cells 3 and 4 are not connected to the MN through the X2 interface. That is, the cells 3 and 4 do not correspond to the NR SCell candidates, which means that the MN cannot perform the EN-DC operation along with the cell 3 or the cell 4. Even if the UE reports the measurement result for the cell 3 or the cell 4, the measurement result for the cell 3 or the cell 4 is not useful for the SN since the SN cannot perform the SCG change to the corresponding cell. Accordingly, the UE does not need to perform the measurement and reporting for the cell 3 or the cell 4.

Additionally, there is no the NR SCell candidate on NR frequency A in FIG. 7. The cells 1, 2, and 5 are only on NR frequencies B and C. Accordingly, the UE does not need to measure the NR frequency A. The NR frequency A need not be configured as a measurement target on the NR side of the UE, and the cell 4 needs to be configured as a blacklist cell on the NR side of the UE.

As described above, in the tight interworking of LTE/NR, there may be a need for the coordination/coordination/negotiation for the MN and the SN to make the measurement, and in particular, there may be a need to allow the MN to transmit measurement target/frequency-related assistance information before the SN configures the measurement. In order to solve the above problems, the present disclosure proposes a solution for how the MN and the SN can cooperate/coordinate/negotiate the measurement configuration and the reporting in the multi-RAT dual connectivity and/or the tight interworking of the LTE/NR.

1. First Embodiment

Figure 8:
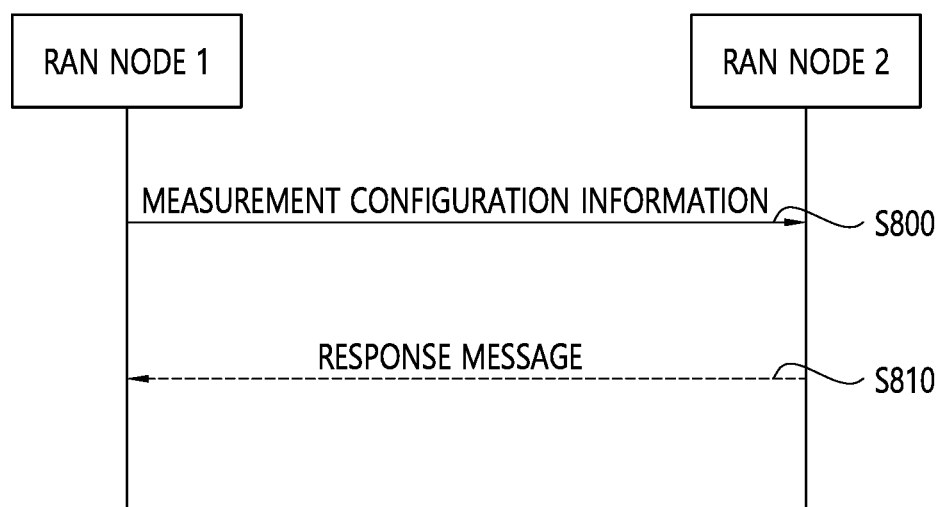
FIG. 8 shows an example of a method for transmitting information on a measurement configuration according to a first embodiment of the present disclosure.

FIG. 8 shows an example of a method for transmitting information on a measurement configuration according to a first embodiment of the present disclosure. In FIG. 8, RAN node 1 determines a measurement frequency at which RAN node 2 configures measurement, and transmits measurement configuration information including the determined measurement frequency to the RAN node 2.

In FIG. 8, the RAN node 1 corresponds to MN in multi-RAT dual connectivity and/or tight interworking of LTE/NR. The RAN node 2 corresponds to the SN in the multi-RAT dual connectivity and/or the tight interworking of the LTE/NR. The RAN node 1 may be an eNB or a gNB. The RAN node 2 may be the gNB. In the following description, the frequency may mean a carrier. There may be a large number of SNs around the RAN Node 1 corresponding to the MN in the multi-RAT dual connectivity and/or the tight interworking of the LTE/NR. Accordingly, in terms of the overall frequency management, the RAN node 1 can control a use of all frequencies. Operation, administration and maintenance (OAM) may help control these frequencies.

Referring to FIG. 8, the RAN node 1 determines the measurement frequency at which each SN configures a measurement. The RAN node 1 may also determine the number of measurement frequencies of each SN. The measurement frequencies and/or the number of measurement frequencies of each SN may be determined based on locations of each SN. The RAN node 1 transmits, to each SN, measurement configuration information including the determined measurement frequencies and/or the determined number of measurement frequencies of each SN. That is, in step S800, the RAN node 1 transmits to the RAN node 2 the measurement configuration information including the determined measurement frequencies and/or the number of measurement frequencies of the RAN node 2.

The RAN node 2 receiving the measurement configuration information from the RAN node 1 follows the determination of the RAN node 1 regarding the measurement. That is, the RAN node 2 can configure the measurement to all UEs served by the RAN node 2 by using the measurement frequency indicated by the measurement configuration information as the measurement target. The UE receiving the measurement configuration from the RAN node 2 may measure the measurement frequency indicated by the measurement configuration and report the measured result to the RAN node 2.

Meanwhile, the RAN node 2 that has received the measurement configuration information from the RAN node 1 may transmit a response message to the RAN node 1 in step S810. The response message may include information indicating whether RAN node 2 follows the determination of the RAN node 1 regarding the measurement. When the RAN node 2 has not followed the determination of the RAN node 1 regarding the measurement, the RAN node 1 may readjust the measurement frequency at which the RAN node 2 will configure the measurement and transmit the measurement configuration information including the information on the adjusted measurement frequency to the RAN node 2 again.

Alternatively, the RAN node 2 may configure the measurement by selecting only a part of the measurement frequencies indicated by the measurement configuration information as the measurement target. In this case, the response message may include the information on the selected measurement frequency or the information on the non-selected measurement frequency.

Figure 9:
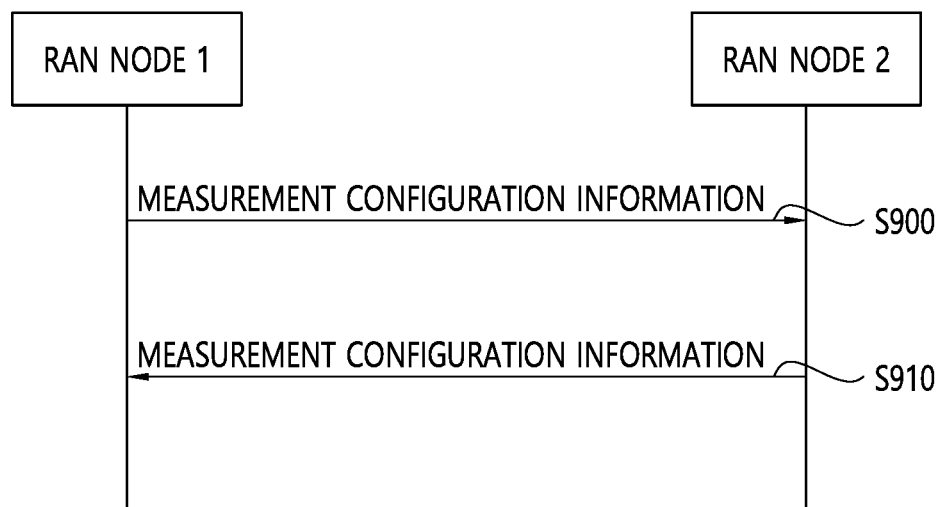
FIG. 9 shows another example of a method for transmitting information on a measurement configuration according to the first embodiment of the present disclosure.

FIG. 9 shows another example of a method for transmitting information on a measurement configuration according to the first embodiment of the present disclosure. In FIG. 9, the RAN node 1 transmits the measurement configuration information related to the measurement configuration of the RAN node 2 to the RAN node 2, and the RAN node 2 determines its own measurement frequency by itself based on the measurement configuration information.

In FIG. 9, the RAN node 1 corresponds to the MN in the multi-RAT dual connectivity and/or the tight interworking of the LTE/NR. The RAN node 2 corresponds to the SN in the multi-RAT dual connectivity and/or the tight interworking of the LTE/NR. The RAN node 1 may be the eNB or the gNB. The RAN node 2 may be the gNB. In the following description, the frequency may mean a carrier. There may be a large number of SNs around the RAN Node 1 corresponding to the MN in the multi-RAT dual connectivity and/or the tight interworking of the LTE/NR. Accordingly, in terms of the overall frequency management, the RAN node 1 can control a use of all frequencies. OAM can help control these frequencies.

Referring to FIG. 9, the RAN node 1 determines its own measurement frequency and/or the number of measurement frequencies. In addition, the RAN node 1 may determine the measurement frequencies and/or the number of measurement frequencies for which neighboring SNs will configure the measurement. The measurement frequencies and/or the number of measurement frequencies of the RAN node 1 and/or the neighboring SNs may be determined based on a location of the RAN node 1 and/or locations of the neighboring SNs. That is, in step S900, the RAN node 1 transmits to the RAN node 2 the measurement configuration information including the determined measurement frequencies and/or the number of measurement frequencies of the RAN node 1 and/or the neighboring SNs.

The RAN node 2 receiving the measurement configuration information from the RAN node 1 determines its own measurement frequency by itself in consideration of the received measurement configuration information. The RAN node 2 can configure the measurement to all UEs served by the RAN node 2 by using the determined measurement frequency as the measurement target. The UE receiving the measurement configuration from the RAN node 2 may measure the measurement frequency indicated by the measurement configuration and report the measured result to the RAN node 2. In step S910, the RAN node 2 transmits measurement configuration information including information on its own determined measurement frequency to the RAN node 1.

Figure 10:
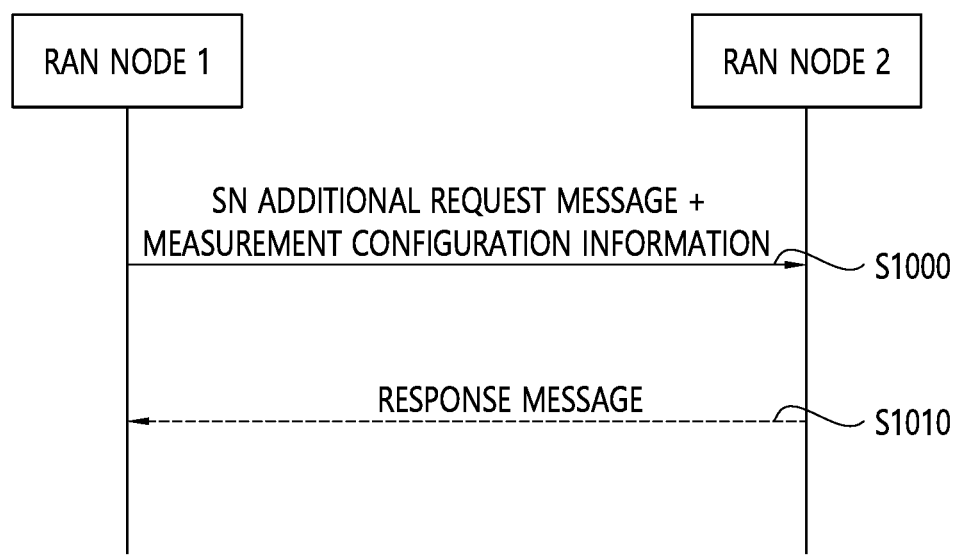
FIG. 10 shows another example of a method for transmitting information on a measurement configuration according to the first embodiment of the present disclosure.

FIG. 10 shows another example of a method for transmitting information on a measurement configuration according to the first embodiment of the present disclosure. In FIG. 10, the RAN node 1 determines the measurement frequency at which the RAN node 2 configures the measurement, and transmits the measurement configuration information including the determined measurement frequency to the RAN node 2. However, unlike FIG. 8, in FIG. 10, the measurement configuration information is transmitted to the RAN node 2 through a UE specific procedure. That is, in FIG. 10, the measurement configuration of the SN may be applied only to a specific UE.

In FIG. 10, the RAN node 1 corresponds to the MN in the multi-RAT dual connectivity and/or the tight interworking of the LTE/NR. The RAN node 2 corresponds to the SN in the multi-RAT dual connectivity and/or the tight interworking of the LTE/NR. The RAN node 1 may be the eNB or the gNB. The RAN node 2 may be the gNB. In the following description, the frequency may mean a carrier. There may be a large number of SNs around the RAN Node 1 corresponding to the MN in the multi-RAT dual connectivity and/or the tight interworking of the LTE/NR. Accordingly, in terms of the overall frequency management, the RAN node 1 can control the use of all frequencies. The OAM can help control these frequencies.

Referring to FIG. 10, the RAN node 1 determines the measurement frequency at which each SN configures the measurement for a specific UE. The RAN node 1 may also determine the number of measurement frequencies of each SN for the specific UE. The measurement frequencies and/or the number of measurement frequencies of each SN for the specific UE may be determined based on locations of each SN. In addition, the measurement frequencies and/or the number of measurement frequencies of each SN for the specific UE may be determined based on characteristics (for example, UE capability) of the specific UE. In step S1000, the RAN node 1 transmits to the RAN node 2 the measurement configuration information including the determined measurement frequencies and/or the number of measurement frequencies of the RAN node 2. The measurement configuration information may be transmitted through, for example, an SN additional request message.

The RAN node 2 receiving the measurement configuration information from the RAN node 1 follows the determination of the RAN node 1 regarding the measurement. That is, the RAN node 2 can configure the measurement to the specific UE by using the measurement frequency indicated by the measurement configuration information as the measurement target. The specific UE receiving the measurement configuration from the RAN node 2 may measure the measurement frequency indicated by the measurement configuration and report the measured result to the RAN node 2.

Meanwhile, the RAN node 2 that has received the measurement configuration information from the RAN node 1 may transmit a response message to the RAN node 1 in step S1010. The response message may include information indicating whether RAN node 2 follows the determination of the RAN node 1 regarding the measurement. When the RAN node 2 has not followed the determination of the RAN node 1 regarding the measurement, the RAN node 1 may readjust the measurement frequency at which the RAN node 2 will configure the measurement and transmit the measurement configuration information including the information on the adjusted measurement frequency to the RAN node 2 again.

Alternatively, the RAN node 2 may configure the measurement by selecting only a part of the measurement frequencies indicated by the measurement configuration information as the measurement target. In this case, the response message may include the information on the selected measurement frequency or the information on the non-selected measurement frequency for the specific UE.

Figure 11:
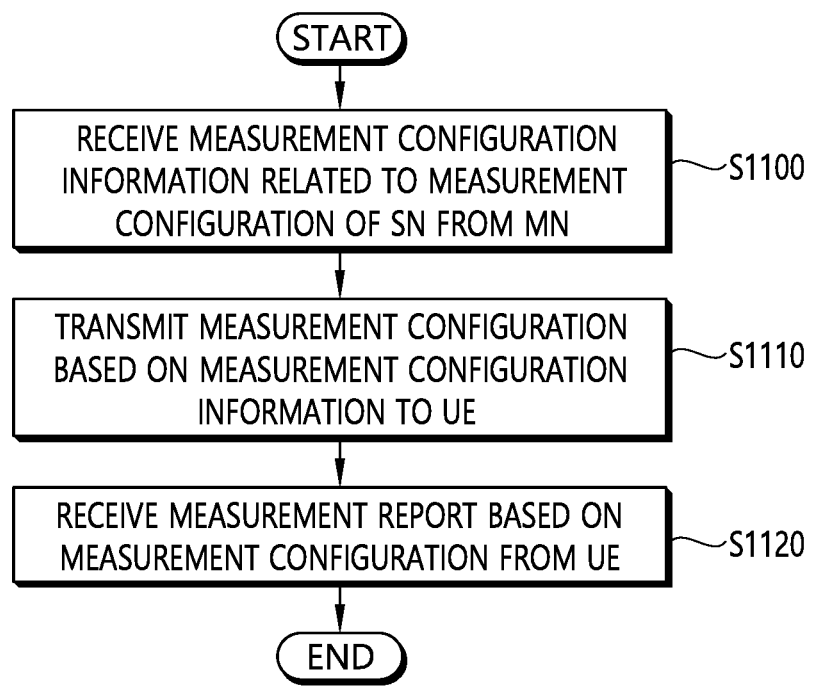
FIG. 11 shows a method for transmitting, by an SN, a measurement configuration in multi-RAT dual connectivity according to the first embodiment of the present disclosure.

FIG. 11 shows a method for transmitting, by an SN, a measurement configuration in multi-RAT dual connectivity according to the first embodiment of the present disclosure. The present disclosure described in FIG. 10 can be applied to this embodiment. In this embodiment, the MN may be the eNB of the LTE or the gNB of the NR, and the SN may be the gNB of the NR. The MN may be the RAN node 1 in FIG. 10, and the SN may be the RAN node 2 in FIG. 10.

In step S1100, the SN receives the measurement configuration information related to the measurement configuration of the SN from the MN. The measurement configuration information may include the information on the measurement frequency of the SN. The information on the measurement frequency of the SN may include the information on the number of measurement frequencies of the SN. The information on the number of measurement frequencies of the SN may include the information on the maximum number of measurement frequencies of the SN. The measurement frequencies and/or the number of measurement frequencies may be determined based on the location of the SN and/or the characteristics of the UE. The measurement configuration information may be transmitted through the SN additional request message.

In step S1110, the SN transmits the measurement configuration based on the measurement configuration information to the UE. The SN may configure the measurement frequency as the measurement target. In step S1120, the SN receives the measurement report based on the measurement configuration from the UE. In addition, the SN may transmit a response message, which is a response to the measurement configuration information, to the MN.

Figure 12:
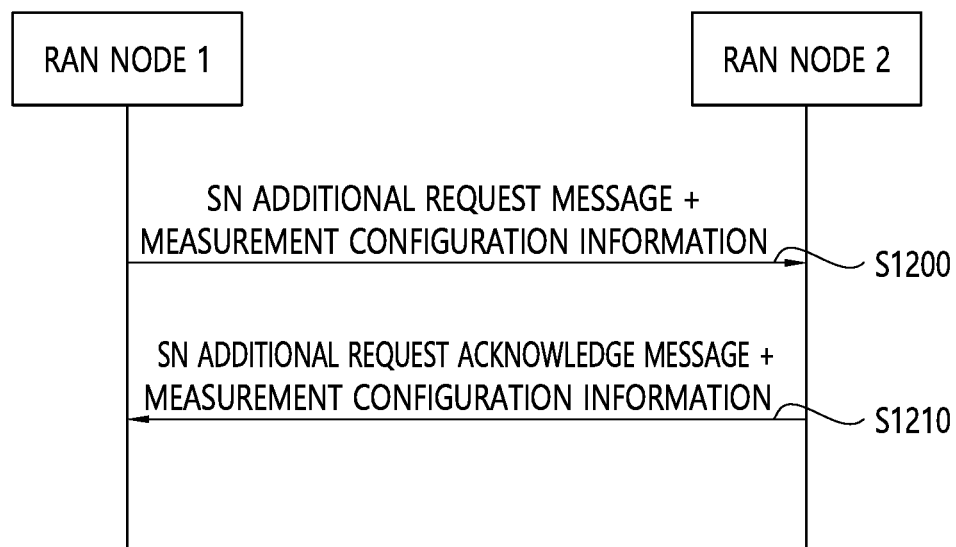
FIG. 12 shows another example of a method for transmitting information on a measurement configuration according to the first embodiment of the present disclosure.

FIG. 12 shows another example of a method for transmitting information on a measurement configuration according to the first embodiment of the present disclosure. Similar to FIG. 9, in FIG. 12, the RAN node 1 transmits the measurement configuration information related to the measurement configuration of the RAN node 2 to the RAN node 2, and the RAN node 2 determines its own measurement frequency by itself based on the measurement configuration information. However, unlike FIG. 9, in FIG. 12, the measurement configuration information is transmitted to the RAN node 2 through the UE specific procedure. That is, in FIG. 12, the measurement configuration of the SN may be applied only to the specific UE.

In FIG. 12, the RAN node 1 corresponds to the MN in the multi-RAT dual connectivity and/or the tight interworking of the LTE/NR. The RAN node 2 corresponds to the SN in the multi-RAT dual connectivity and/or the tight interworking of the LTE/NR. The RAN node 1 may be the eNB or the gNB. The RAN node 2 may be the gNB. In the following description, the frequency may mean a carrier. There may be a large number of SNs around the RAN Node 1 corresponding to the MN in the multi-RAT dual connectivity and/or the tight interworking of the LTE/NR. Accordingly, in terms of the overall frequency management, the RAN node 1 can control the use of all frequencies. The OAM can help control these frequencies.

Referring to FIG. 12, the RAN node 1 determines its own measurement frequency and/or the number of measurement frequencies for the specific UE. In addition, the RAN node 1 may determine the measurement frequencies and/or the number of measurement frequencies for which the neighboring SNs will configure the measurement for the specific UE. The measurement frequencies and/or the number of measurement frequencies of the RAN node 1 and/or the neighboring SNs for the specific UE may be determined based on a location of the RAN node 1 and/or locations of the neighboring SNs. In addition, the measurement frequencies and/or the number of measurement frequencies of the RAN node 1 and/or the neighboring SNs for the specific UE may be determined based on characteristics (for example, UE capability) of the specific UE. In step S1200, the RAN node 1 transmits to the RAN node 2 the measurement configuration information including the determined measurement frequencies and/or the number of measurement frequencies of the RAN node 1 and/or the neighboring SNs for the specific UE. The measurement configuration information may be transmitted through, for example, the SN additional request message.

The RAN node 2 receiving the measurement configuration information from the RAN node 1 determines its own measurement frequency by itself for the specific UE in consideration of the received measurement configuration information. The RAN node 2 may configure the measurement to the specific UE by using the determined measurement frequency as the measurement target. The specific UE receiving the measurement configuration from the RAN node 2 may measure the measurement frequency indicated by the measurement configuration and report the measured result to the RAN node 2. In step S1210, the RAN node 2 transmits the measurement configuration information including the information on its own determined measurement frequency to the RAN node 1. The measurement configuration information may be transmitted through, for example, the SN additional request acknowledge message.

According to the first embodiment of the present disclosure described above, the measurement configuration can be effectively cooperated/coordinated/negotiated between the LTE/NR in the multi-RAT dual connectivity and/or the tight interworking of the LTE/NR. Accordingly, in the multi-RAT dual connectivity and/or the tight interworking of the LTE/NR, the UE may be better served, and issues of the mixed measurement configuration and reporting may not occur for the UE. In addition, an SN change, a handover, an intra-SN movement, etc., for the UE may be effectively managed.

2. Second Embodiment

Figure 13:
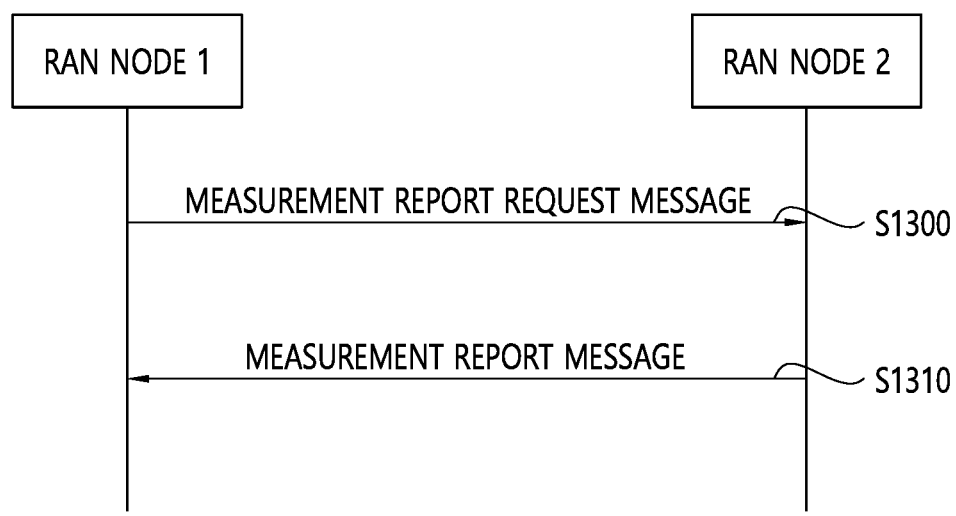
FIG. 13 shows an example of a method for reporting a measurement result according to a second embodiment of the present disclosure.

FIG. 13 shows an example of a method for reporting a measurement result according to a second embodiment of the present disclosure. In FIG. 13, RAN node 1 triggers to report a measurement result, so RAN node 2 reports the measurement result to the RAN node 1. In this case, the trigger is event-based. That is, when it is determined that a specific event occurs and the measurement result of the RAN node 2 is necessary, the RAN node 1 triggers to report the measurement result to the RAN node 2, so that the RAN node 2 reports the measurement result to the RAN node 1. In FIG. 13, the RAN node 1 corresponds to an MN in multi-RAT dual connectivity and/or tight interworking of the LTE/NR. The RAN node 2 corresponds to an SN in the multi-RAT dual connectivity and/or the tight interworking of the LTE/NR. The RAN node 1 may be an eNB or a gNB. The RAN node 2 may be the gNB. In the following description, the frequency may mean a carrier.

Based on the first embodiment of the present disclosure described above, the RAN node 1 configures/manages the measurement report of the UE for a specific frequency, and the RAN node 2 configures/manages the measurement report of the UE for another specific frequency. To help the RAN node 1 make determinations such as handover, SN change, or bearer type change (for example, from a master cell group (MCG) bearer to an SCG bearer, or from the SCG bearer to the MCG bearer), it may be preferable that the RAN node 1 has the measurement result of the UE with respect to the measurement frequency managed by the RAN node 2. The RAN node 1 considers not only the measurement result of the UE for the measurement frequency managed by itself but also the measurement result of the UE for the measurement frequency managed by the RAN node 2, and thus it is possible to more accurately determine at which frequency it is desirable to handover and whether to perform the SN change or the bearer type change.

Referring to FIG. 13, in step S1300, the RAN node 1 transmits a measurement report request message to the RAN node 2. The measurement report request message may include an indicator requesting the measurement result of the UE for a frequency in which the RAN node 1 is interested among the measurement frequencies managed by the RAN node 2. Alternatively, the measurement report request message may include an indicator requesting the measurement result of the UE for all measurement frequencies managed by the RAN node 2.

Upon receiving the measurement report request message from the RAN node 1, the RAN node 2 transmits to the RAN node 1 the measurement report message including the measurement result of the UE for the measurement frequency requested by the RAN node 1 in step S1310. If the RAN node 1 requests the measurement result of the UE for the frequency in which the RAN node 1 is interested among the measurement frequencies managed by the RAN node 2 in step S1300, the measurement report message may include the measurement result of the UE for the frequency in which the RAN node 1 is interested. If the RAN node 1 requests the measurement results of the UE for all the measurement frequencies managed by the RAN node 2 in step S1300, the measurement report message may include the measurement results of the UE for all the measurement frequencies managed by the RAN node 2.

The RAN node 1 receiving the measurement report message from the RAN node 2 may determine the handover, the SN change, the bearer type change, or the like in consideration of the measurement result of the UE for the measurement frequency managed by the RAN node 1 and the measurement result of the UE for the measurement frequency managed by the RAN node 2.

Figure 14:
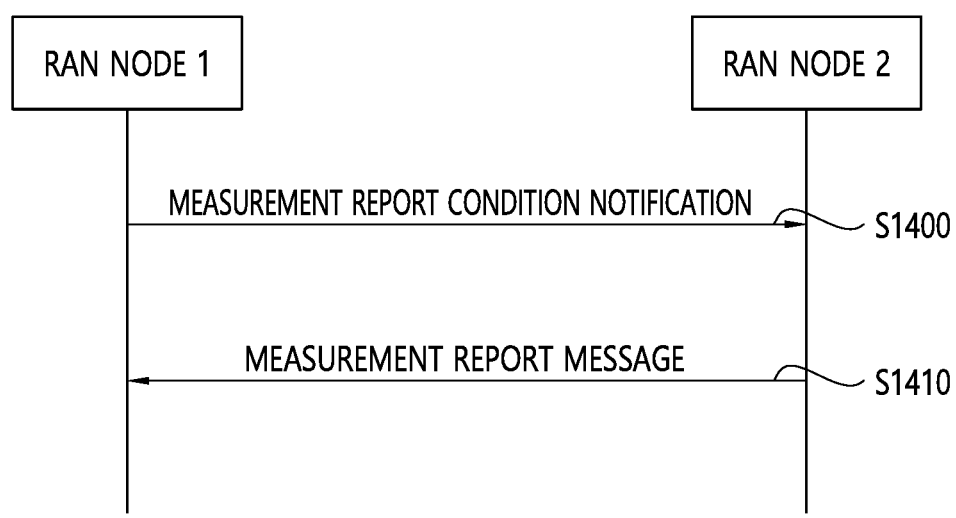
FIG. 14 shows another example of a method for reporting a measurement result according to a second embodiment of the present disclosure.

FIG. 14 shows another example of a method for reporting a measurement result according to a second embodiment of the present disclosure. Similar to FIG. 13, in FIG. 14, the RAN node 1 triggers to report the measurement result, so the RAN node 2 reports the measurement result to the RAN node 1. In this case, the trigger is condition-based. That is, the RAN node 1 sets a condition (for example, a threshold) that triggers the reporting of the measurement result, and the RAN node 2 reports the measurement result to the RAN node 1 whenever the condition is satisfied. In FIG. 14, the RAN node 1 corresponds to an MN in multi-RAT dual connectivity and/or tight interworking of the LTE/NR. The RAN node 2 corresponds to an SN in the multi-RAT dual connectivity and/or the tight interworking of the LTE/NR. The RAN node 1 may be an eNB or a gNB. The RAN node 2 may be the gNB. In the following description, the frequency may mean a carrier.

Based on the first embodiment of the present disclosure described above, the RAN node 1 configures/manages the measurement report of the UE for a specific frequency, and the RAN node 2 configures/manages the measurement report of the UE for another specific frequency. To help the RAN node 1 make determinations such as handover, SN change, or bearer type change (for example, from an MCG bearer to an SCG bearer, or from the SCG bearer to the MCG bearer), it may be preferable that the RAN node 1 has the measurement result of the UE for the measurement frequency managed by the RAN node 2. The RAN node 1 considers not only the measurement result of the UE for the measurement frequency managed by itself but also the measurement result of the UE for the measurement frequency managed by the RAN node 2, and thus it is possible to more accurately determine at which frequency it is desirable to handover and whether to perform the SN change or the bearer type change.

Referring to FIG. 14, in step S1400, the RAN node 1 transmits a measurement report condition notification message to the RAN node 2. The measurement report condition notification message may include the condition that the RAN node 2 triggers the transmission of the measurement report message. The condition may be a specific threshold. The condition may include the condition of triggering the transmission of the measurement result of the UE for the frequency in which the RAN node 1 is interested among the measurement frequencies managed by the RAN node 2. Alternatively, the condition may include the condition of triggering the transmission of the measurement result of the UE for all the measurement frequencies managed by the RAN node 2.

The RAN node 2 receiving the measurement report condition notification message from the RAN node 1 sets the condition for the UE according to the condition included in the measurement report condition notification message. In step S1410, whenever the condition is satisfied, the RAN node 2 transmits a measurement report message including the measurement result of the UE for the measurement frequency requested by the RAN node 1 to the RAN node 1. If the RAN node 1 transmits the condition of triggering the transmission of the measurement result of the UE for the frequency in which the RAN node 1 is interested among the measurement frequencies managed by the RAN node 2 in step S1400, the measurement report message may include the measurement result of the UE for the frequency in which the RAN node 1 is interested. If the RAN node 1 transmits the condition of triggering the transmission of the measurement results of the UE for all the measurement frequencies managed by the RAN node 2 in step S1400, the measurement report message may include the measurement results of the UE for all the measurement frequencies managed by the RAN node 2.

The RAN node 1 receiving the measurement report message from the RAN node 2 may determine the handover, the SN change, the bearer type change, or the like in consideration of the measurement result of the UE for the measurement frequency managed by the RAN node 1 and the measurement result of the UE for the measurement frequency managed by the RAN node 2.

The second embodiment described above has been described as an example in which the RAN node 1, i.e., the MN in the multi-RAT dual connectivity and/or the tight interworking of the LTE/NR, triggers the transmission of the measurement report message. However, the present disclosure is not limited thereto, and may be applied to the case where the SN in the multi-RAT dual connectivity and/or the tight interworking of the LTE/NR triggers the transmission of the measurement report message. That is, if the SN needs the measurement result of the UE for the measurement frequency managed by the MN, the SN may transmit the measurement report request message to the MN (event-based or condition-based), such that the MN may transmit the measurement report message to the SN. In this case, in FIGS. 13 and 14 described above, the RAN node 1 may correspond to the SN in the multi-RAT dual connectivity and/or the tight interworking of the LTE/NR, and the RAN node 2 may correspond to the MN in the multi-RAT dual connectivity and/or the tight interworking of the LTE/NR.

According to the second embodiment of the present disclosure described above, in the multi-RAT dual connectivity and/or the tight interworking of the LTE/NR, a first RAT (LTE or NR) may receive a measurement report of a second RAT (NR or LTE). Accordingly, the SN change, the handover, the intra-SN movement, or the bearer type change, etc., for the UE may be effectively managed.

Figure 15:
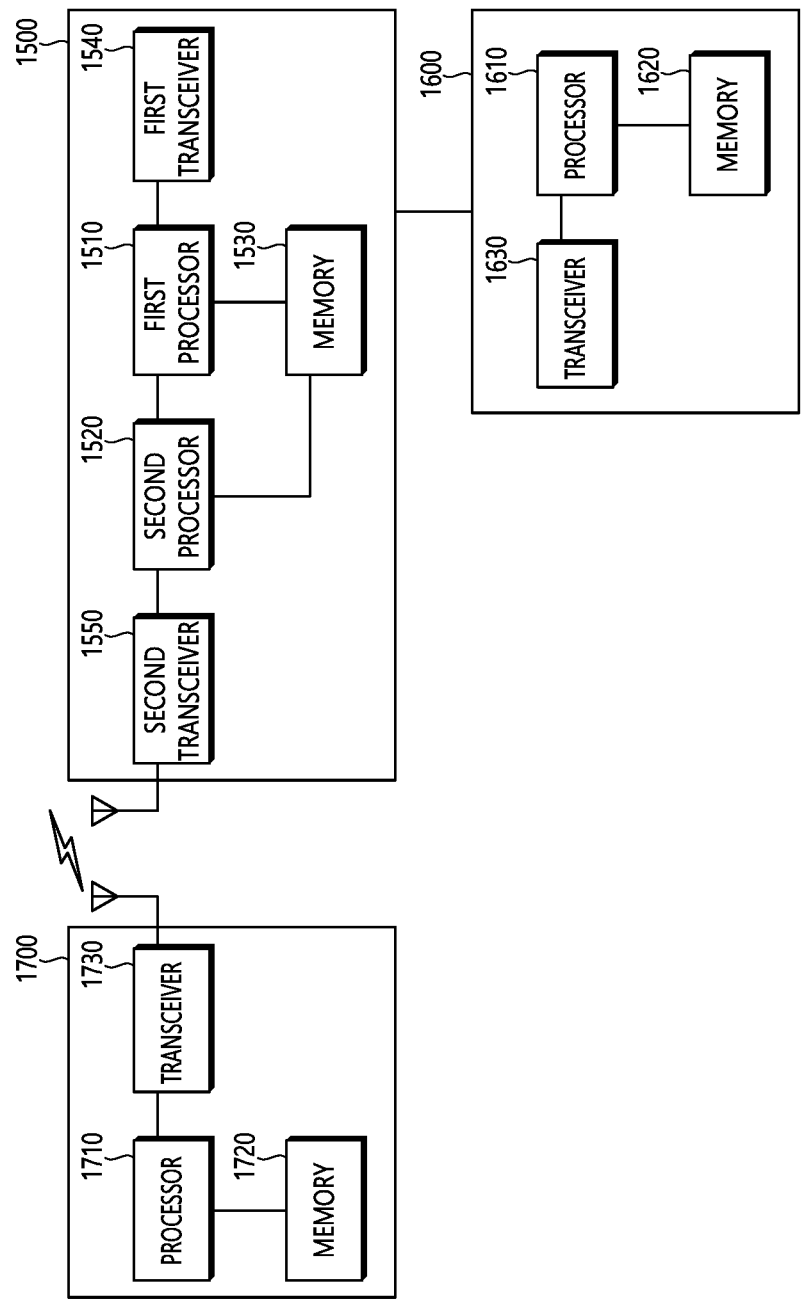
FIG. 15 shows a wireless communication system in which the embodiment of the present disclosure is implemented.

FIG. 15 shows a wireless communication system in which the embodiment of the present disclosure is implemented.

An RAN node 2 1500 includes a first processor 1510, a second processor 1520, a memory 1530, a first transceiver 1540, and a second transceiver 1550. The RAN node 2 1500 corresponds to the RAN node 2 or the SN in the embodiment of the disclosure described in FIGS. 8 to 14. The memory 1530 is connected to the first processor 1510 and the second processor 1520, and stores various information for driving the first processor 1510 and the second processor 1520. The first transceiver 1540 is connected to the first processor 1510 and transmits a signal to an RAN node 1 1600 or receives a signal from the RAN node 1 1600. The second transceiver 1550 is connected to the second processor 1520 and transmits a wireless signal to an UE 1700 or receives a wireless signal from the UE 1700.

The first processor 1510 may be configured to implement functions, processes, and/or methods related to interaction with the RAN node 1 1600 described herein. More specifically, the first processor 1510 may control the first transceiver 1540 to perform step S800 and/or step S810 in FIG. 8. The first processor 1510 may control the first transceiver 1540 to perform step S900 and/or step S910 in FIG. 9. The first processor 1510 may control the first transceiver 1540 to perform step S1000 and/or step S1010 in FIG. 10. The first processor 1510 may control the first transceiver 1540 to perform step S1100 in FIG. 11. The first processor 1510 may control the first transceiver 1540 to perform step S1200 and/or step S1210 in FIG. 12. The first processor 1510 may control the first transceiver 1540 to perform step S1300 and/or step S1310 in FIG. 13. The first processor 1510 may control the first transceiver 1540 to perform step S1400 and/or step S1410 in FIG. 14.

The second processor 1520 may be configured to implement functions, processes, and/or methods related to interaction with the UE 1700 described herein. More specifically, the second processor 1520 may control the second transceiver 1550 to perform step S1110 and/or step S1120 in FIG. 11.

In FIG. 15, the first processor 1510 and the second processor 1520 are shown to be configured independently of each other, which is merely an example. The first processor 1510 and the second processor 1520 may be configured to be integrated into one processor. In addition, in FIG. 15, the first transceiver 1540 and the second transceiver 1550 are shown to be configured independently of each other, which is merely an example. The first transceiver 1540 and the second transceiver 1550 may be configured to be integrated into one transceiver.

The RAN node 1 1600 includes a processor 1610, a memory 1620, and a transceiver 1630. The RAN node 1 1600 corresponds to the RAN node 1 or the MN in the embodiment of the disclosure described in FIGS. 8 to 14. The memory 1620 is connected to the processor 1610 and stores various information for driving the processor 1610. The transceiver 1630 is connected to the processor 1610 and transmits a signal to the RAN node 2 1500 or receives the signal from the RAN node 2 1500.

The processor 1610 may be configured to implement functions, processes, and/or methods related to interaction with the RAN node 2 1500 described herein. More specifically, the processor 1610 may control the transceiver 1630 to perform step S800 and/or step S810 in FIG. 8. The processor 1610 may control the transceiver 1630 to perform step S900 and/or step S910 in FIG. 9. The processor 1610 may control the transceiver 1630 to perform step S1000 and/or step S1010 in FIG. 10. The processor 1610 may control the transceiver 1630 to perform step S1100 in FIG. 11. The processor 1610 may control the transceiver 1630 to perform step S1200 and/or step S1210 in FIG. 12. The processor 1610 may control the transceiver 1630 to perform step S1300 and/or step S1310 in FIG. 13. The processor 1610 may control the transceiver 1630 to perform step S1400 and/or step S1410 in FIG. 14.

The UE 1700 includes a processor 1710, a memory 1720, and a transceiver 1730. The memory 1720 is connected to the processor 1710 and stores various information for driving the processor 1710. The transceiver 1730 is connected to the processor 1710 and transmits a wireless signal to the RAN node 2 1500 or receives the wireless signal from the RAN node 2 1500. The processor 1710 may be configured to implement functions, processes, and/or methods related to interaction with the RAN node 2 1500 described herein. More specifically, the processor 1710 may control the transceiver 1730 to perform step S1110 and/or step S1120 in FIG. 11.

The processor 1510, 1520, 1610, 1710 may include application-specific integrated circuit (ASIC), other chipset, logical circuit and/or data processing device. The memory 1530, 1620, 1720 may include read-only memory (ROM), random access memory (RAM), flash memory, memory card, storage medium and/or other storage device. The transceiver 1540, 1550, 1630, 1730 may include a baseband circuit for processing a radio frequency signal. When an embodiment is implemented by software, the aforementioned method may be implemented by a module (process or function) which performs the aforementioned function. The module may be stored in the memory 1530, 1620, 1720 and executed by the processor 1510, 1520, 1610, 1710. The memory 1530, 1620, 1720 may be installed inside or outside the processor 1510, 1520, 1610, 1710 and may be connected to the processor 1510, 1520, 1610, 1710 via various well-known means.

Figure 16:
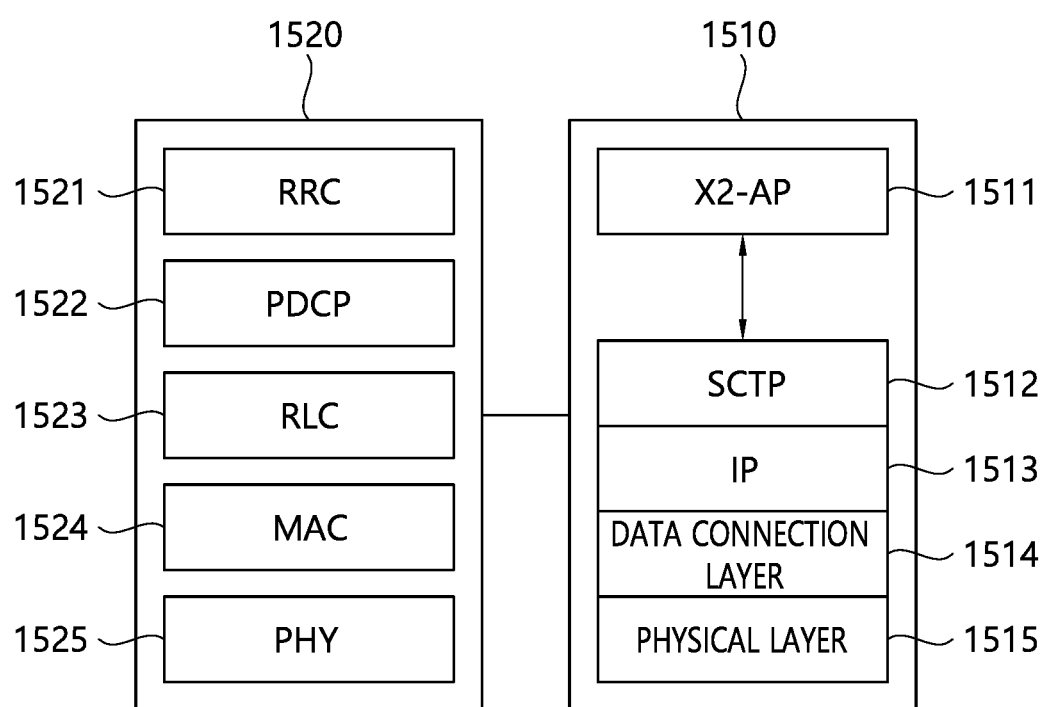
FIG. 16 shows the first and the second processor of the RAN node 2 shown in FIG. 15.

FIG. 16 shows the first and the second processor of the RAN node 2 shown in FIG. 15.

An X2 application protocol (X2-AP) layer 1511, a stream control transmission protocol (SCTP) layer 1512, an Internet protocol (IP) layer 1513, a data connection layer 1514, and a physical layer 1515 may be implemented by the first processor 1510. The X2-AP layer 1511 is included in the radio network layer (RNL). RNL defines a procedure related to the interaction between eNBs. The X2-AP layer 1511 defines the protocol responsible for providing signaling information through the X2 interface. The X2-AP layer 1511 is terminated by two eNBs connected to each other through the X2 interface. The X2-AP layer 1511 may be implemented by the X2-AP procedure module. The X2-AP layer 1511 may be configured to implement functions, processes and/or methods of the first processor 1510. The SCTP layer 1512, IP layer 1513, data connection layer 1514, and physical layer 1515 may be included in the transport network layer (TNL). TNL provides the user plane and service for signaling delivery.

An RRC layer 1521, a packet data convergence protocol (PDCP) layer 1522, a radio link control (RLC) layer 1523, a media access control (MAC) layer 1524, and a physical layer 1525 may be implemented by the second processor 1520. The RRC layer 1521 may be configured to implement functions, processes and/or methods of the second processor 1520.

Figure 17:
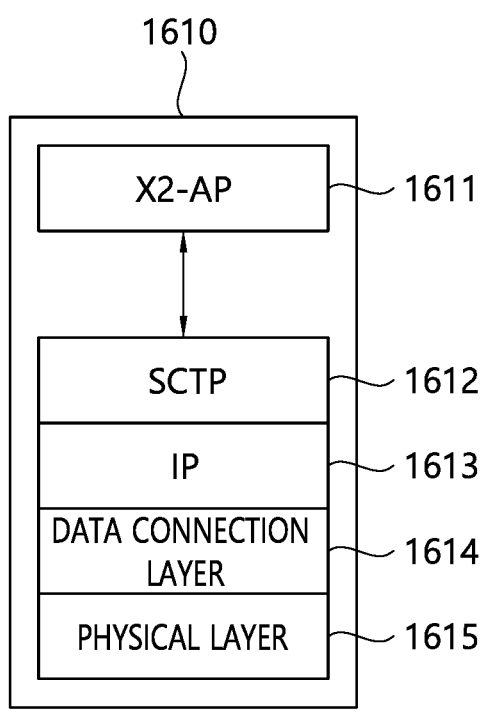
FIG. 17 shows a processor of the RAN node 1 shown in FIG. 15.

FIG. 17 shows a processor of the RAN node 1 shown in FIG. 15. The X2-AP layer 1611, SCTP layer 1612, IP layer 1613, data connection layer 1614, and physical layer 1615 may be implemented by the second processor 1610. The X2-AP layer 1611 is included in the RNL. RNL defines a procedure related to the interaction between eNBs. The X2-AP layer 1611 defines the protocol responsible for providing signaling information through the X2 interface. The X2-AP layer 1611 is terminated by two eNBs connected to each other through the X2 interface. The X2-AP layer 1611 may be implemented by the X2-AP procedure module. The X2-AP layer 1611 may be configured to implement functions, processes and/or methods of the processor 1610. The SCTP layer 1612, IP layer 1613, data connection layer 1614, and physical layer 1615 may be included in the TNL. TNL provides the user plane and service for signaling delivery.

Figure 18:
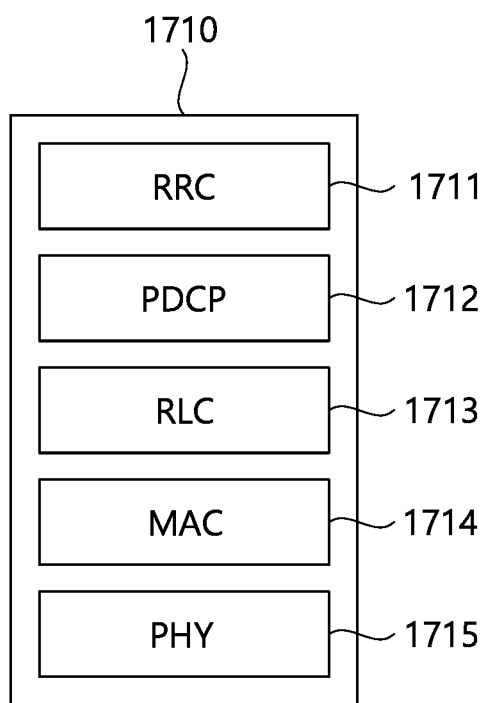
FIG. 18 shows a processor of the UE shown in FIG. 15.

FIG. 18 shows a processor of the UE shown in FIG. 15. The RRC layer 1711, PDCP layer 1712, RLC layer 1713, MAC layer 1714, and physical layer 1715 may be implemented by the processor 1710. The RRC layer 1711 may be configured to implement functions, processes and/or methods of the processor 1710.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a secondary node (SN) in a multi radio access technology (RAT) dual connectivity, the method comprising:
receiving, from a master node (MN), a SN addition request message including configuration information, wherein the configuration information includes information on a maximum number of frequency carriers for which the SN is allowed to configure with a PSCell for measurements;
transmitting, to the MN, a SN addition request acknowledge message in response to the SN addition request message;
configuring a user equipment (UE) in a radio resource control (RRC)_CONNECTED state to perform measurements in accordance with a measurement configuration based on the configuration information,
wherein the measurement configuration is provided to the UE by an RRC reconfiguration message;
receiving, from the UE, a measurement report in accordance with the measurement configuration; and
forwarding the measurement report to the MN.

2. The method of claim 1, where in the method further comprises, configuring frequency carriers as a measurement target based on the configuration information.

3. The method of claim 1, wherein the configuration information is based on a location of the SN.

4. The method of claim 1, wherein the configuration information is based on a characteristic of the UE.

5. The method of claim 1,
wherein the MN is an eNodeB (eNB) of a long-term evolution (LTE) network or a gNB of a new radio access technology (NR) network, and
wherein the SN is the gNB of the NR network.

6. A secondary node (SN) in a multi radio access technology (RAT) dual connectivity, the SN comprising:
a memory;
a transceiver; and
a processor operatively connected to the memory and the transceiver, and configured to:
control the transceiver to receive, from a master node (MN), a SN addition request message including configuration information, wherein the configuration information includes information on a maximum number of frequency carriers for which the SN is allowed to configure with a PSCell for measurements;
control the transceiver to transmit, to the MN, a SN addition request acknowledge message in response to the SN addition request message;
configure a user equipment (UE) in a radio resource control (RRC) CONNECTED state to perform measurements in accordance with a measurement configuration based on the configuration information,
wherein the measurement configuration is provided to the UE by an RRC reconfiguration message; and
control the transceiver to receive, from the UE, a measurement report in accordance with the measurement configuration; and
forwarding the measurement report to the MN.

7. The SN of claim 6, wherein the processor is further configured to, configure frequency carriers as a measurement target based on the configuration information.

8. The SN of claim 6, wherein the configuration information is based on a location of the SN.

9. The SN of claim 6, wherein the configuration information is based on a characteristic of the UE.

10. The SN of claim 6,
wherein the MN is an eNodeB (eNB) of a long-term evolution (LTE) network or a gNB of a new radio access technology (NR) network, and
wherein the SN is the gNB of the NR network.

11. A user equipment (UE) in a multi radio access technology (RAT) dual connectivity, the UE comprising:
a memory;
a transceiver; and
a processor operatively connected to the memory and the transceiver, and configured to:
control the transceiver to receive, from a secondary node (SN) while in an RRC_CONNECTED state, a radio resource control (RRC) reconfiguration message including a measurement configuration to perform measurements,
wherein the measurement configuration is based on configuration information which is transmitted from a master node (MN) via a SN addition request message, and wherein the configuration information includes information on a maximum number of frequency carriers for which the SN is allowed to configure with a PSCell for measurements; and control the transceiver to transmit, to the SN, a measurement report in accordance with the measurement configuration, wherein the measurement report is forwarded to the MN.

12. The UE of claim 11, wherein the configuration information is based on a location of the SN.

13. The UE of claim 12, wherein the configuration information is based on a characteristic of the UE.

14. The UE of claim 12, wherein the MN is an eNodeB (eNB) of a long-term evolution (LTE) network or a gNB of a new radio access technology (NR) network, and wherein the SN is the gNB of the NR network.

* * * * *